United States Patent
Smith et al.

(10) Patent No.: US 6,200,618 B1
(45) Date of Patent: Mar. 13, 2001

(54) COLD WATER DISINFECTION OF FOODS

(75) Inventors: Durand M. Smith, Salt Lake City; Dale S. Winger; Joshua N. Brown, both of West Jordan, all of UT (US)

(73) Assignee: EcoPure Food Safety Systems, Inc., Salt Lake City, UT (US)

(*) Notice: Subject to any disclaimer, the term of this patent is extended or adjusted under 35 U.S.C. 154(b) by 0 days.

(21) Appl. No.: 09/420,372

(22) Filed: Oct. 18, 1999

(51) Int. Cl.$^7$ ............................... A23B 7/144; A23L 3/00
(52) U.S. Cl. ..................... 426/320; 426/335; 426/532; 426/615; 426/644
(58) Field of Search .................. 426/320, 532, 426/335, 644, 615

(56) References Cited

U.S. PATENT DOCUMENTS

| | | |
|---|---|---|
| 3,065,620 | 11/1962 | Houser . |
| 3,130,570 | 4/1964 | Rentzepis . |
| 3,194,628 | 7/1965 | Cannon . |
| 3,877,152 | 4/1975 | Gorman . |
| 3,916,652 | 11/1975 | Speakman . |
| 4,219,415 | 8/1980 | Nassef et al. . |
| 4,300,367 | 11/1981 | Thorsen . |
| 4,434,086 | 2/1984 | Hill et al. . |
| 4,462,880 | 7/1984 | Hill et al. . |
| 4,476,041 | 10/1984 | Hill et al. . |
| 4,488,973 | 12/1984 | Hill et al. . |
| 4,770,884 * | 9/1988 | Hill et al. ............................ 426/335 |
| 5,014,211 | 5/1991 | Turner et al. . |
| 5,041,483 | 8/1991 | Burch . |
| 5,053,140 | 10/1991 | Hurst . |
| 5,093,140 * | 3/1992 | Wantanabe ........................ 426/335 |
| 5,118,322 | 6/1992 | Wasinger et al. . |
| 5,123,176 | 6/1992 | Yamada et al. . |
| 5,236,512 | 8/1993 | Rogers et al. . |
| 5,313,811 | 5/1994 | Wasinger et al. . |
| 5,322,637 | 6/1994 | O'Grady . |
| 5,366,746 | 11/1994 | Mendenhall . |
| 5,404,732 | 4/1995 | Kim . |
| 5,456,809 | 10/1995 | Cooper . |
| 5,460,705 | 10/1995 | Murphy et al. . |
| 5,460,833 * | 10/1995 | Andrews et al. .................. 426/335 |
| 5,493,743 | 2/1996 | Schneider et al. . |
| 5,763,382 | 6/1998 | Cooper et al. . |
| 5,849,678 | 12/1998 | Murch . |
| 5,858,435 * | 1/1999 | Gallo ................................. 426/320 |

FOREIGN PATENT DOCUMENTS

| | | |
|---|---|---|
| 593933 | 9/1925 | (FR) . |
| 6-313194A | 11/1994 | (JP) . |
| 95/06712 A1 | 8/1995 | (WO) . |
| WO 97/20097 | 11/1996 | (WO) . |

* cited by examiner

*Primary Examiner*—Helen Pratt
(74) *Attorney, Agent, or Firm*—Trask Britt

(57) ABSTRACT

The invention includes a method of reducing the microbial population on food in a container. The method generally involves the application of both a surfactant and ozone containing wash liquor to the food. The method includes introducing a wash liquor into the container, thus contacting the food with the wash liquor and wetting the food. A surfactant is then added to the wash liquor. This surfactant containing wash liquor is then allowed to contact the food for a period of time. Next, a combination of ozone gas, oxygen and/or air is mixed into the wash liquor to form an ozonated wash liquor. This ozonated wash liquor then remains in contact with the food for a period of time.

20 Claims, 2 Drawing Sheets

COLD WATER DISINFECTION OF FOODS

TECHNICAL FIELD

The invention relates generally to a method of reducing the microbial load on foods. More specifically, this invention relates to a method of disinfecting, sanitizing, or sterilizing foods involving the use of ozone in combination with a surfactant.

BACKGROUND

Ozone is an unstable triatomic allotrope of oxygen. It is produced in an energized environment wherein molecular oxygen dissociates into monatomic oxygen which subsequently collides and recombines with an oxygen molecule to form a highly reactive ozone molecule.

Although ozone is primarily employed in disinfection, it can perform other functions such as color reduction, odor and taste removal, algae control, oxidation of inorganic and organic compounds in water and waste-water treatment practices, waste gas treatment and bleaching of paper pulp.

The most prominent features of ozone as a biocide lie in its speed and selectivity in oxidation. Biocidal effects are believed to primarily be achieved through oxidation. Consistent with this belief, the ability of any chemical to reduce microbial viability is in direct proportion to its oxidation potential. Ozone is the fourth most powerful oxidizing agent known; only fluorine, fluorine dioxide, and monatomic oxygen are thought to be more reactive. Ozone possesses an oxidation potential of 2.07 millivolts relative to chlorine gas' 1.36 millivolts. It is important to note that an increased oxidation potential is indicative of an accelerated bacterial kill. The rate of disinfection has been demonstrated to be more than 3,000 times faster than chlorine; thus contact time is a lesser consideration in the application of ozone as a microbicide.

Disinfection with the use of ozone may proceed by oxidation directly and by intermediate hydroperoxy compounds that can interact with cytosolic components. Organic ozone chemistry would predict that oxidized organic compounds containing carbon-carbon double bonds give rise to hydroperoxyalcohols. Evidence exists that organic peroxides exert a stronger bacteriocidal action than hydrogen peroxide due to a greater tendency to decompose. No evidence is believed to exist in the literature of any microorganism that is resistant to the effects of ozone exposure. The application of ozone is preferable due to its compatibility with biota. There are no residual or harmful reaction products downstream particularly in the range of 0–20 ppm. The presence of peroxidic compounds could be perceived to be harmful to the biota, but toxicity studies indicate the contrary to be true. Studies have shown that these compounds are chemically highly unstable and rapidly decompose. It has also been shown that these compounds can be removed by other oxidizing molecules.

In addition to demonstrating powerful capabilities in the destruction or inactivation of bacteria, fungi and protozoa; ozone has been shown to be virucidal. The efficacy of ozone has been reported to range from (all of the following values given reported a 99% reduction) 2.2 mg/l for *Escherichia coli* in 19 minutes from raw waste water; 0.02 mg/l for *Candida tropicalis* in 0.30 minutes from ozone-demand free water; 1.2 mg/l for *Naegleria gruberi* in 1.1 minutes from ozone-demand free phosphate buffer solution and 0.2 mg/l for Poliovirus type I in 9 minutes from activated sludge effluent. With regard to bacterial spores (specifically, *Bacillus subtilis v. globigii*), ozone has been shown to achieve a four-log reduction within 1.5–2 minutes when water is purged with 3% ozone by weight. Using a non-toxic concentration of 4 $\mu$g ozone per ml of serum, ozone can achieve a six-log reduction in the infectious titer of human immunodeficiency virus ("HIV").

Presently, two methods of "bioburden" reduction are used on food: high temperature pasteurization, and chemical disinfection. The high temperatures used in pasteurization denature proteins and degrade the organoliptics present in food, altering both texture and flavor. Surfactant use alone is incapable of disinfecting to the degree of high temperature pasteurization. Chemical disinfection can leave behind undesirable residues.

Currently, commercial preparation of many foods, which do not normally require cooking, requires the use of high temperature heat pasteurization to disinfect ingredients before they are used. This results in foods that do not have acceptable flavor and texture. A need exists for a reliable cold water method of reducing food bioburden to acceptable levels.

It would be an improvement in the art to have a relatively economical, reliable method of disinfecting, sanitizing or sterilizing foods, which is similar in effectiveness to high temperature pasteurization, yet uses low temperatures to preserve flavor and texture.

DISCLOSURE OF THE INVENTION

The invention includes a method of reducing microbial load on food, the method comprising: applying an ozonated wash liquor to the food, applying a surfactant to the food, and maintaining the application of ozonated wash liquor and surfactant to the food for a sufficient amount of time to reduce the microbial load on the food. In the method, the application of the ozonated wash liquor to the food can occur before, during, and/or after the application of surfactant to the food. The the application of ozonated wash liquor and surfactant to the food should preferably occur for a sufficient amount of time to remove soils and chemical contaminants from the food (such as fertilizers, pesticides, herbicides, mycotoxins, and mixtures of any thereof).

The invention also includes a method of reducing the microbial load on foods through the use of a spray with or without scrubbing and/or a bath with or without agitation. The method includes introducing the food and a surfactant containing wash liquor into the bath, thus bringing the food and wash liquor into contact to wet the surface of the food. Generally, the surfactant containing wash liquor will contact the food for a period of time ranging from about 1 minute to about sixty (60) minutes. A combination of ozone gas, oxygen and/or air is mixed into the wash liquor to form an ozonated wash liquor. Preferably, this ozonated wash liquor contacts the food for a period of time ranging from about one (1) minute to sixty (60) minutes.

In one embodiment, the method is used for the disinfection of "shiny-skinned" fruits, such as apples, pears, peaches and the like. This method comprises contacting the whole fruit with a wash liquor at a temperature of about 0° C. (Celsius) to about 50° C. The wash liquor is an admixture of aqueous solution and a oleic, or citirc acid containing surfactant. The fruit is thus wetted. A gaseous mixture of ozone gas, oxygen and/or air is mixed with the wash liquor to form an ozonated wash liquor containing from about 0.01 ppm to about 15 ppm ozone. The ozonated wash liquor is then allowed to contact the fruit for a period of time ranging from about one (1) minute to about sixty (60) minutes (preferably five to fifteen minutes) thus disinfecting the surface of the fruit.

The process results in disinfected, sanitized, or sterilized fruit. As shown herein bacterial spores are even killed. The temperature can be greatly reduced relative to using high temperature pasteurization, while retaining similar disinfecting capabilities. Alkalinity can also be reduced relative to using only surfactant as a disinfectant. This allows for the preservation of the texture and flavor of the fruit, by avoiding protein denaturation and organoliptic degradation. The application of the ozone and surfactant combination in disinfection, sanitization or sterilization processes results in improved texture and flavor quality.

BEST MODE OF THE INVENTION

Figure 1:
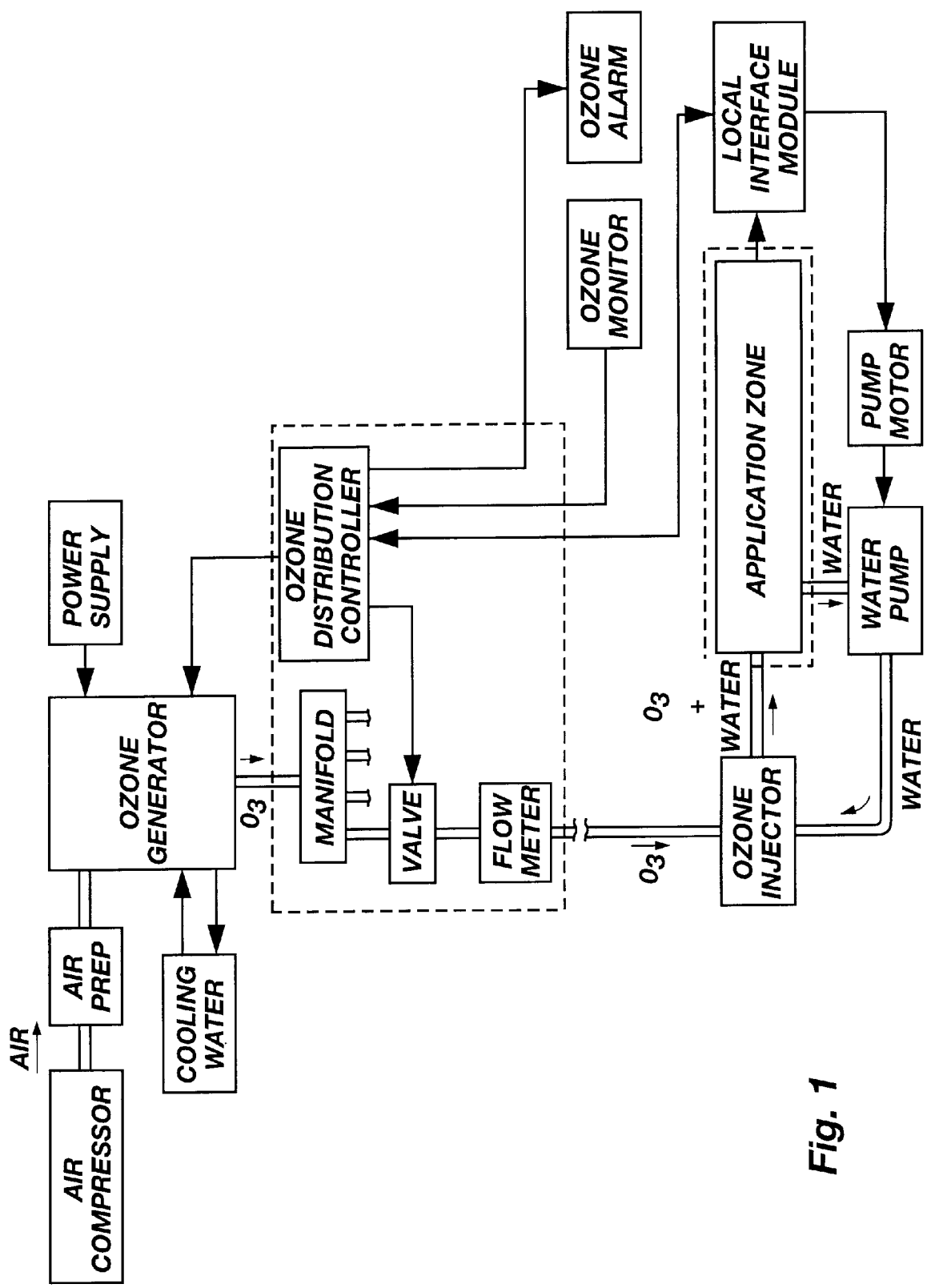
FIG. 1 is a block diagram illustrating the principal components of a machine utilizing an ozone injection system which may be used to carry out the method of the present invention.
Figure 2:
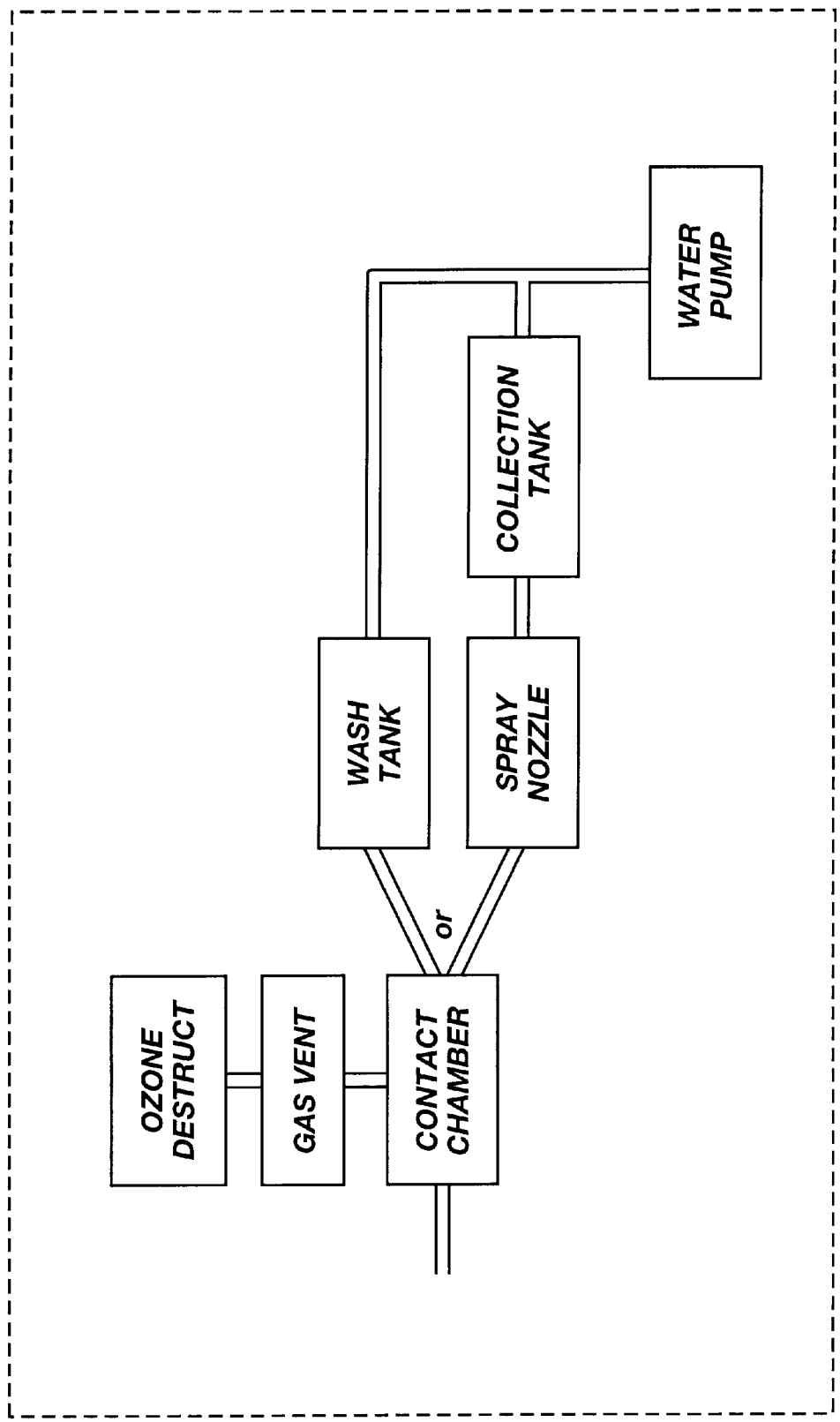
FIG. 2 is a more detailed depiction of the "APPLICATION ZONE" component of FIG. 1.

The cold water method (i.e., water below a temperature of about 50° C.) includes sufficient amounts of the selected ingredients within each operational step to disinfect, or sanitize the food. The actual amounts of ingredients will be dependent on both the food type and the amount, and type of disinfection which needs to be done.

In a preferred mode, the method is carried out in three steps, consisting of two disinfecting operations followed by a rinsing operation. The first step comprises introducing the food, and a wash liquor including water with or without ozone and a surfactant into a spray or tub, in order to wet the food and bring it into contact with the surfactant. This step lasts for a period of time from about one (1) minute to about sixty (60) minutes, at a temperature of about 0° C. to about 30° C., and at a pH of about 3 to about 11. The second step comprises adding ozone gas, oxygen and or air into a wash liquour that includes water with or without surfactant and ozone. This is done by injecting gaseous ozone into the wash liquor producing a concentration of up to about 15% ozone by weight in the wash liquor. This step lasts for a period of time from about one (1) minute to about sixty (60) minutes, at a temperature of about 0° C. to about 30° C., and at a pH of about 6 to about 8. The liquid contents of the tub are then drained leaving the wetted food within the tub.

Methods of generating ozone and producing ozonated liquids are respectively disclosed in U.S. Pat. No. 5,213,773 to Burris, May 25, 1993, and in U.S. Pat. No. 5,181,399 to Engel et al., Jan. 6, 1993, the contents of which are incorporated herein by reference. In one preferred mode, the ozone gas is generated from oxygen or oxygen-enriched air by a corona discharge device that produces concentrations ranging between about 1% to about 15% by weight of ozone. The combination of ozone gas, oxygen, and/or oxygen-enriched air introduced into the liquid mixture comprises bubbles of gas having a size from about 5 microns to about 5000 microns in diameter entrained in the liquid portion of the liquid mixture.

In this mode, the concentration of ozone in the ozonated wash liquor ranges from about 0.01 ppm to about 15 ppm depending on the type of food, and the amount of disinfection required. The pH of the ozonated wash liquor at a pH from about 6 to 8. The temperature of the wash liquor is preferably maintained at a temperature in the range of about 0° C. to about 30° C.

Generally, the method will use "GRAS" (generally recognized as safe) surfactants. The presently preferred surfactant may contain water, oleic acid, glycerol, ethanol, potassium hydroxide, baking soda, citric acid, and distilled grapefruit oil, and is commercially available under the trade designation "FIT" (available from Proctor & Gamble Corp., Cincinnati, Ohio). As an alternative, VEGGIE WASH™ (Horsley, Ltd of UK) may be used. It contains plantaren, sucrose esters, cocoyl glutamate (from coconut, sweet corn and palm kernel oils), trisodium citrate, and glycerin (all vegetable derived). Other surfactants tested were Stepanol WA-100, Surfonic L12-8, Acolec Z-3, Kosher Emplex, Tween-80, Do-Crest 60K, and Alcolec S. Useful surfactants are disclosed in U.S. Pat. No. 5,849,678 to Murch et al. (Dec. 15, 1998), the entire contents of which are incorporated by this reference.

Water is preferably used in the present invention as a carrier for ozone molecules.

The third step comprises rinsing the food with non-ozonated water. This step lasts for a period of time from about one (1) minute to about fifteen (15) minutes, at a temperature of about 0° C. to about 30° C., and at a pH of about 6 to about 8. The method is completed by draining the rinse solution.

The invention is further explained by the following illustrative EXAMPLES:

EXAMPLE I

A method of cold water washing to disinfect food was tested as follows: 25 ml of a *Escherichia coli* (ATCC number 25922) suspension (a distilled water suspension containing $1\times10^9$ CFU/ml *E. coli*) were placed on 25 g of raw cabbage for each sample. Samples were placed in the tubs, wetted with water and treated by addition of ingredients to the water. One was treated with only ozone for a period of 10 minutes at a pH of 7.5. One was treated with ozone immediately after adding 0.6g/L of surfactant (FIT) for a period of 10 minutes at a pH of 8.5. One was treated with a surfactant (FIT) for 10 minutes followed by a treatment with ozone for 10 minutes, pH was 8.5, the temperature was 21° C. A control was not treated. All were samples were maintained at 21° C.

The ozone only sample resulted in a 93% decrease in *E. coli* relative to the control, the FIT alone resulted in an 82.5% decrease, and the ozone immediately following surfactant resulted in a 98.8% decrease. This shows that the ozone is a more effective sanitizing agent than the surfactant alone, and that the use of surfactant after ozone treatment results in no additional sanitization.

EXAMPLE II

A method of cold water washing to disinfect tomato fiber from naturally occurring microflora was conducted. One sample was maintained as a control. One sample was treated with a surfactant (FIT) at 0.15 g/l for five minutes. One sample was treated with a surfactant and ozone for five minutes.

The sample treated with surfactant alone resulted in a 40% reduction of the microflora and with the combination of the surfactant and ozone the result was a 56% reduction.

References herein to specific Examples or embodiments should not be interpreted as limitations to the invention's scope which is determined by the claims.

What is claimed is:

1. A method of reducing microbial load on food, said method consisting essentially of:

applying an ozonated wash liquor to the food, applying a surfactant to the food, and maintaining said application of ozonated wash liquor and surfactant to the food for a sufficient amount of time to reduce the microbial load on the food.

2. The method of claim 1 wherein the application of said ozonated wash liquor to the food occurs before the application of surfactant to the food.

3. The method of claim 1 wherein the application of said ozonated wash liquor to the food occurs substantially simultaneously as the application of surfactant to the food.

4. The method of claim 1 wherein the application of said ozonated wash liquor to the food occurs after the application of surfactant to the food.

5. The method of claim 1 wherein the application of ozonated wash liquor and surfactant to the food occurs for a sufficient amount of time to remove soils and chemical contaminants from the food.

6. The method of claim 5 wherein the chemical contaminant is selected from the group consisting of fertilizers, pesticides, herbicides, mycotoxins, and mixtures of any thereof.

7. The method of claim 1 wherein the surfactant comprises water, oleic acid, glycerol, ethanol, potassium hydroxide, baking soda, citric acid, and distilled grapefruit oil.

8. The method of claim 1 wherein the food is selected from the group consisting of cranberries, apples, cabbage, lettuce, spinach, eggs, salad components, herbs, and berries.

9. A method of reducing the microbial load on food contained within a container, said method consisting essentially of:

introducing a wash liquor into said container, thus contacting the food with the wash liquor and wetting the food;

introducing a surfactant into the wash liquor;

contacting the food with the surfactant containing wash liquor for a first period of time;

introducing a combination of ozone and gas, said gas selected from the group consisting of air, oxygen, and mixtures thereof into the wash liquor to form an ozonated wash liquor; and contacting the food with the ozonated wash liquor for a second period of time.

10. The method of claim 9, wherein the first and second periods of time are from about one (1) minute to about sixty (60) minutes.

11. The method of claim 9 wherein the wash liquor is removed from the container at a first point, and further comprising: introducing said combination of ozone and gas to the wash liquor at a second point; and re-introducing said ozonated wash liquor into the container at a third point.

12. The method according to claim 9 wherein the wash liquor is removed from the container at a first point, and further comprising: new wash liquor is added at a second point.

13. The method of claim 9 wherein the wash liquor's temperature is monitored.

14. The method according to claim 9 wherein the wash liquor is maintained at a temperature of about 0° C. to about 50° C.

15. The method according to claim 9 wherein the concentration of surfactant is from about 0.6 g/l to about 6 g/l.

16. The method according to claim 9 wherein the combination of ozone and gas comprises bubbles having a size from about 5 microns to about 5000 microns in diameter entrained within the ozonated wash liquor.

17. The method according to claim 9 wherein the ozone gas is generated by a corona discharge device that produces concentrations ranging between about 1% to about 15% ozone by weight.

18. The method according to claim 9 further compromising monitoring the ozonated wash liquor's ozone concentration.

19. The method according to claim 9 wherein the concentration of ozone in the ozonated wash liquor is from about 0.01 ppm to about 15 ppm of ozonated wash liquor.

20. The method of claim 9 wherein said food is selected from the group consisting of meat, poultry, and fish.

\* \* \* \* \*